United States Patent Office 3,573,944
Patented Apr. 6, 1971

3,573,944
MODIFIED CLAY
Stanley E. Gebura, Mount Lakes, N.J., assignor to
Interpace Corporation, Parsippany, N.J.
No Drawing. Filed Apr. 22, 1968, Ser. No. 723,301
Int. Cl. C09c 3/02
U.S. Cl. 106—288    15 Claims

ABSTRACT OF THE DISCLOSURE

A process has been provided for modifying siliceous substances containing aluminum oxide from which bound water has been driven off, such as by heating at elevated temperature or by azeotropic distillation with certain solvents. The product thus prepared is reacted with an alkylene divinyl ether capable of polymerization at a site of the siliceous substance from which water has been removed. As a surprising advantage, a divinyl ether does polymerize substantially only on the surface of the siliceous materials rather than propagate into the solvent and form homopolymers. Products prepared by this process are within the scope of the invention as are the uses of these products for purposes as adjuvants in poly(ester) and oleaginous composition formulations.

---

This invention relates to a process for preparing siliceous substances by polymerizing an alkylene divinyl ether onto a surface of aluminum oxide containing siliceous substance from which bound water has been removed. A product obtained by the practicing of the process is within the scope of the invention as are the uses of this product, such as in poly(ester) oleaginous, paint, poly (vinyl chloride), and alkyd compositions.

According to the process described herein, siliceous substances, such as clays, are suitable for use in the process if these are capable of being activated by removal of water from certain sites in the crystalline structure, e.g., by heating or by azeotropic distillation with appropriate solvents. It is believed that polymerization takes place at the site from which the bound water is removed. However, the above is merely a theory.

A major reason for modifying siliceous substances is the relative availability of these low cost materials, and, thus, the attendant economic advantages if these materials may be employed as adjuvants or substitutes for a more scarce or expensive material. Another major reason for modifying these siliceous substances is the extremely small particles which are useful for bodying various materials. These particles may be obtained by appropriately working up the naturally occurring clays by various processes well known to the art. Thus, if these small particles which possess large surface area per unit of weight are admixed with various liquids, a pronounced bodying effect is obtained. Hence, for this reason properly modified clays are useful in fluids such as paints, greases, oils, etc. Consequently, an important reason for seeking modification of clay surfaces is to obtain proper compatibility and dispersions of the siliceous material.

Another reason for modifying the surface of clays and siliceous substances is the natural tendency of these surfaces to be hydrophilic and organophobic. To render these siliceous materials, e.g., clays, useful for the above purposes, the objective is to make these organophilic. Obviously, depending on the material to which these siliceous substances will be added various modifications are proposed. For example, if polar, organic materials are involved, certain properties must be demonstrated by modified clay to show compatibility with the environment displaying the particular polarity.

The foregoing makes it clear that many expensive materials have been sought to be substituted in whole or in part by siliceous materials and that in the process, siliceous materials have been sought which, if modified, can substitute or replace the expensive material. Needless to say, a proper mating of a siliceous substance as adjuvant with another material involves a multitude of problems, many interrelated and most of these highly unpredictable.

More importantly though, in order to render each siliceous substance suitable as an adjuvant, many modifications have been proposed. Hence, a number of criteria have to be satisfied before a proper combination of the material and its siliceous substance adjuvant can be found. It is for this reason that the finding of a proper combination of material and adjuvant has been and still is an empirical art with few, if any, guidelines. Consequently, predictable results in this field have eluded the prior art practitioner.

PRIOR ART

Prior art processes for modifying siliceous materials are numerous.

While a number of processes have been disclosed in the prior art for modifying siliceous substances with ethylenically unsaturated monomers, these processes have depended first on reacting the siliceous substance with a coupling compound or a derivative thereof. These coupling compounds possess an unsaturated radical or a radical capable of entering into a polymerization reaction with the ethylenically unsaturated monomer. These coupling aids are derived from compounds such as an amine, an alcohol, a quaternary ammonium compound, a sulfinium, salts of ethylenically unsaturated acids, polymers containing the above groups or various siloxanes, silanes or organic silicon derivatives, e.g., organosilicon halides.

Not only do these coupling compounds add another step in a polymerization process, but the added cost of an element in this type of combination is often prohibitive when modifying such a low price commodity as clay.

Other methods of polymerizing ethylenically unsaturated compounds on the surface of a siliceous substance depend on depositing a free radical generating compound such a peroxide or an azo compound and then polymerizing under appropriate conditions the ethylenically unsaturated compound. However, merely because a free radical generating compound is deposited on the surface does not necessarily result in a polymerization on or at the surface, and considerable amounts of homopolymer is formed in a reaction solution. An analogous process to that above employs an acid for treating ion exchange active clays and then reacting the same with compounds such as conjugated diolefins.

Still another method of polymerizing the ethylenically unsaturated compounds depends on the presenting of a freshly ground surface to the monomer and, thus, effecting polymerization. Because of long grinding times, imprecise polymerization controls, and concurrent grinding and polymerization, this process has failed as a viable alternative for modifying siliceous substances. Moreover, it is believed that the reaction mechanism is also different from that herein. Further, in instances where the process has been employed, silica surfaces derived from quartz, silica sand, flint, etc., have been used. These are extremely hard particles and require great expenditure of energy for every grinding operation.

Still further, a method has been disclosed wherein clay has been used as a catalyst to polymerize styrene which then deposits on another surface. Obviously, this method testifies to the homopolymerization of the vinyl compound, and, thus, the failure of polymerization on the surface of the siliceous compound.

From the previous prior art processes and problems, it is apparent that many routes have been tried to obtain a properly modified clay surface. Despite the profusion of processes and approaches, it is still an art to find the proper modifier which achieves satisfactory results on basis of monomer utilizations, monomer depositions, surface properties, etc.—products which may be employed in systems to which siliceous materials are generally added.

SILICEOUS SUBSTANCES

As siliceous substances, those containing aluminum oxide are useful. These siliceous substances are clays such as kaolinite, attapulgite, montmorillonite, illite, pyrophillite and halloysite. Of the above clays, kaolinite is the preferred species.

"Kaolin clay" or "kaolin" describes several hydrated aluminosilicate minerals, generally of platelike structure and comprising species: kaolinite, nacrite, halloysite, dikcite, kaolinitic minerals are described by the general formula $Al_2O_3 \cdot 2SiO_2 \cdot xH_2O$ in which $x$ is usually 2. The weight ratio of $SiO_2$ to $Al_2O_3$ is 1.18, and kaolin clays normally possess $SiO_2/Al_2O_3$ ratios from 1.0 to 1.5. As the kaolinitic minerals possess bound water, the last is removed before these minerals may be employed in the present process. Bound water is defined as water removable at low temperatures and which does not destroy the structure of the clay. For sake of convenience, the removal of bound water is called "activation."

A representative kaolin clay is Hydrite 10 obtainable from Whittaker, Clark and Daniels, Inc., 100 Church St. New York, N.Y. It is a hydrated aluminum silicate (kaolin), non-reactive towards either acids or alkalies. It is readily deflocculated by common dispersing agents, e.g., caseinates, polymerized phosphates, sodium silicate, etc. It is compatible with both aqueous and non-aqueous vehicles. This clay is of white color of a brightness of 88 (G.E. brightness) and is obtained from various sources in southern states of the United States, e.g., Georgia, and, therefore, often called Georgia kaolin.

Typical physical constants are:

PHYSICAL PROPERTIES

Tapped bulk:
20 grams—500 times _____ 35 cc.
Apparent density _____ 35.6 lbs./cu. ft.
Loose bulk:
20 grams _____ 89.1 cc.
Apparent density _____ 13.7 lbs./cu. ft.
Specific gravity, 2.58:
True density _____ 21.66 lbs./gal.
Bulking figure _____ .04617 gal./lbs.
Reflectance:
Green stim. filter _____ 88.0
Refractive Index _____ 1.56.
Oil absorption (rub-cut) _____ 42.
Sieve fineness:
Thru 325 mesh _____ 99.98%.

TYPICAL PARTICLE SIZE DISTRIBUTION

Equivalent spherical diameter _____ Percent Cumulative
Under (microns):
4 _____ 100
2 _____ 95
1 _____ 80
0.5 _____ 44
0.2 _____ 7

CHEMICAL COMPOSITION

Silica ($SiO_2$) _____ 44.94
Aluminum oxide ($Al_2O_3$) _____ 38.22
Ferric oxide ($Fe_2O_3$) _____ 0.27
Calcium oxide (CaO) _____ 0.06
Magnesium oxide (MgO) _____ 0.28
Titanium dioxide ($TiO_2$) _____ 1.75
Potash ($K_2O$) _____ 0.04
Soda ($Na_2O$) _____ 0.21
Loss on ignition _____ 13.6
Moisture, max. _____ 1.0
Free moisture _____ 0.52

Other suitable siliceous materials are the Glomax series of kaolin clays such as Glomax LL available from Georgia Kaolin Co. The properties and particle size distribution of these series of clays are illustrated in its Bulletin TSB–5 (this bulletin also gives fairly typical particle size distribution curves for kaolin clays); MiSil A–15; and "Amorphous Silica "0" Grade," available from Illinois Mineral Company, Cairo, Ill.; and "Ione" airfloated kaolin clay, available from Interspace Corp., Parsippany, N.J. Typical properties of the last are:

PHYSICAL PROPERTIES

Specific gravity _____ 2.60
Moisture (max.) percent _____ 0.5–1.0
Screen residue 325 mesh (max.) percent _ 0.0–0.1
Particle size, percent
Minus 2 microns _____ 50–55
Plus 5 microns _____ 20–25
G.E. brightness, percent _____ 75–76
pH _____ 4.5–5.5
Modulus of rupture—Dry, p.s.i. _____ 52
Water of plasticity, percent _____ 31.9
Average particle size _____ 2.2M
Oil absorption, percent _____ 36

CHEMICAL ANALYSIS

Silica, percent _____ 45.0–47.0
Alumina, percent _____ 37.5–39.0
Iron oxide, percent _____ 0.3–0.5
Titanium dioxide, percent _____ 1.5–2.0
Ignition loss _____ 13.0–14.0

As can be appreciated, clays of various particle size distribution may be employed. The overall range of particle size for the various clays as a group may be from submicron to 100 microns. Those clays having median particle size of less than 15 microns are preferred. Obviously, the above siliceous substances are given merely by way of an example, the diverse, useful siliceous substances having been recited previously.

For purposes of suitable comparisons on a relative as well as on an absolute scale of the various properties of the novel, modified siliceous substances, Hydrite 10 is used as a standard.

THE MONOMERS

Suitable divinyl ether monomers can be best described by the formulae

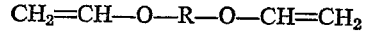
$CH_2=CH-O-R-O-CH=CH_2$ and

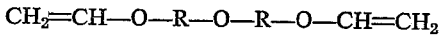
$CH_2=CH-O-R-O-R-O-CH=CH_2$ wherein R is an alkyl group, straight or branched, of 2 or more carbon atoms and which may contain substituents.

Of the divinyl ether compounds suitable in the present process, those derived from alkylene diols of 6 carbon atoms are preferred. The divinyl ethers derived from diols of 2 to 4 carbon atoms constitute the most preferred group of monomers. Other representative divinyl ethers are derived from polyoxyalkylenes. A typical divinyl ether represented by the first formula is butane diol divinyl ether or 1,4-di(vinyloxy)butane, and 1,5-bis(vinyloxy)-3-oxapentane which is a typical compound represented by the second formula. In order to effect polymerization of the divinyl ether with the surface of the siliceous compound, the latter must be activated to remove bound water therefrom.

Two convenient activation routes are available. In one the activation is carried out by heating clay or siliceous substances containing alumina at about 300° C. or higher, i.e., to 500° C. and even up to 700° C. As the amount of bound water varies from one sample of clay to another, the activation is carried out until an insignificant amount of water or substantially no water is given off.

According to the second route, the activation may be practiced by refluxing at atmospheric pressure a solvent containing siliceous substances in dispersion and removing water as an azeotrope. An example of a suitable solvent is benzene, toluene, xylene, cumene, petroleum ether, and solvents such as naphthas boiling between 50° C. and 150° C. Choice of a suitable solvent as well as quantity thereof is principally dependent upon ease of manipulation. From 1 to 5 parts by weight of solvent per weight of clay is usually sufficient for this purpose.

Following the activation step, a monomer which is to be polymerized may be added at a practical rate to the solvent containing the dispersed siliceous substance while the latter is refluxed.

After heating in the dry state, the clay or silica is cooled and then reacted with the monomer which is dispersed in an appropriate vehicle or solvent. The latter is substantially free of water. Polymerization is initiated spontaneously without an intentional addition of an initiator. Following this polymerization reaction, the modified clay or siliceous substance is recovered by filtration and drying below the temperature at which the polymerizate decomposes.

Based on practical considerations, the amount of polymer addition is from 0.1% to 10%, generally from 0.25% to 2%, on basis of weight of the siliceous material. More importantly, this addition is achieved with little, if any, of the polymer propagating into the solvent. This is an important advantage as the expensive monomer material is not lost by homopolymerization in solvent. Moreover, the unreacted monomer can be recovered or recycled for later use. Hence, the preferential polymerization on the surface and virtually no polymer formation in the solvent is an important economic consideration.

In order to describe the present invention so that it may be more clearly understood, the following examples are set forth in which all parts are expressed in parts by weight unless otherwise stated. The examples are set forth primarily for the purpose of illustration and any specific enumeration of detail contained therein should not be interpreted as a limitation on the concept of this invention.

Example 1

Kaolin clay, previously identified as Hydrite 10, was activated by heating the same at 300° C. for about an hour. 100 grams of this activated clay were dispersed in 500 ml. of dried petroleum ether. To this dispersion were added, during a period of 20 minutes and at room temperature, 2 grams of butane diol divinyl ether dissolved in 50 ml. of dried petroleum ether. After the monomer had been completely added, the system was refluxed for about an hour. Thereafter, the dispersion was filtered and the clay filter cake was dried.

Example 2

150 grams of kaolin clay (Hydrite 10) were activated at 700° C. and reacted in a similar manner with 4 grams of butane diol divinyl ether. After reaction, 2.5 grams of the ether were recovered from the filtrate by distillation.

As a comparison, α-methyl styrene was similarly reacted with the same, activated clay. Data showed that about 40% of the spontaneous polymerization product adsorbed on the clay and about 60% of the monomer was converted to low molecular weight polymer which remained dissolved in the solvent. Similar results were obtained with styrene.

As mentioned before, the modified clay products are suitable for polyester dispersions as adjuvants therein.

Suitable polyesters are those derived from a dibasic acid and a polyol, such as a diol. Preferred dibasic acids are phthalic, isophthalic, maleic acid, and fumaric acid. The polyol may be bifunctional, such as a diol with a small amount of triol added thereto. A mono or diethylenically unsaturated compound is added for the purpose of cross-linking the polyester, especially in case of an unsaturated dibasic acid. If the latter is admixed with a monoethylenically unsaturated compound, such as styrene, it also serves as a diluent. The various polyesters are well known to those skilled in the art. The polyester dispersions compounded with the modified siliceous materials are useful for forming structures and formed shapes with reinforcing materials, such as glass fibers, e.g., as weather boards, car bodies and boats.

About 10% to 90% of clay may be compounded with a polyester, the amount depending on the desired end use for the polyester composition. About 10% to 50% is the usual range.

Flexural strength of the polyester filled structures with the clay adjuvant is determined according to ASTM D-790. Impact strength is determined according to ASTM D-256.

As previously indicated, kaolin clay as modified according to Example 1 herein was dispersed in a polyester in a ratio of 40% clay to 60% polyester. This modified clay is suitable for formulations with polar polymeric materials because of the particular characteristics of the monomer employed, i.e., the ether backbone.

A comparison of this modified clay, uncoated clay, and raw clay was made on the basis of Brookfield viscosity. The polyester used was obtained from Pittsburgh Plate Glass designated by it as RS-5003. The following data were obtained:

| Clay: | Cps. |
|---|---|
| Raw, 20 r.p.m. | 57,000 |
| Dried, 20 r.p.m. | 80,000 |
| Coated, 20 r.p.m. | 39,500 |

As another aspect of this invention, the modified clay is useful for compounding with oleaginous materials, such as hydrocarbons, e.g., mineral oil. Whereas clay as coated herein dispersed readily, did not agglomerate, and gave a good bodying effect in a mineral oil, giving a final viscosity of 1300 cps. at 20 r.p.m. in a Brookfield viscometer; raw or dried Hydrite 10 did not form a stable dispersion with the same mineral oil. A typical oil which is employed for evaluating and comparing the modified clays is sold under the tradename "Nujol."

Besides the above-demonstrated applications, the clays as modified according to this invention are also suitable for advantageous incorporation in poly(vinyl chloride) blends, paints, and alkyd base compositions. In this connection, the conventional testing procedures used in these arts for evaluating the efficacy of the additives are employed in reference to the herein described adjuvants.

What is claimed is:

1. A fine, particulate of clay or silica said clay or silica having a surface modified with a polymerizate of an alkylene divinyl ether or polyoxy alkylene divinyl ether in an amount from 0.1% to 10%, on basis of the weight of dry siliceous substance.

2. A fine, particulate clay said clay having as a polymerizate on its surface a polymerizate of an alkylene divinyl ether.

3. A product according to claim 1 wherein the alkylene divinyl ether is of the formula

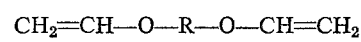

wherein R is an alkyl group of a straight or branched chain of more than two carbon atoms.

4. A product according to claim 3 wherein the alkylene divinyl ether is 1,4(divinyloxy)butane.

5. A product according to claim 1 wherein the polyoxy alkylene divinyl ether is of the formula $$CH_2=CH-O-R-O-R-O-CH=CH_2$$

wherein R is an alkyl group of a straight or branched chain of more than two carbon atoms.

6. A product according to claim 5 wherein the polyoxyalkylene divinyl ether is 1,5-bis(vinyloxy) - 3 - oxapentane).

7. A product according to claim 1 wherein clay is kaolin clay and the polymerizate is poly(1,4-di(vinyloxy)butane).

8. The method for forming a finely divided organophilic particulate from clay or silica, said method comprising the steps of: heating the particulate to drive off at least part of bound water therefrom; cooling said particulate; adding a substantially water free solution of an alkylene divinyl ether or polyoxyalkylene divinyl ether; polymerizing said ether on the surface of the particulate material while refluxing the solvent; and recovering the particulate material with the polymerizate on the surface thereof by filtering and drying the same.

9. The process according to claim 8 wherein the particulate material is kaolin, the temperature to which it is heated is at least 300° C., the solvent is dried petroleum ether, and the divinyl ether is 1,4-di(vinyloxy)butane.

10. The method of forming a finely divided organophilic particulate clay, said method comprising the steps of: adding to clay a solvent forming an azeotrope with the bound water of said clay upon heating; heating to reflux said solvent to form an azeotrope with bound water, said refluxing to remove at least part of bound water; adding to the solvent an alkylene divinyl ether or a polyoxy alkylene divinyl ether; continuing refluxing until a polymerizate of said ether is formed on the surface of said clay; and recovering said organophilic clay particulate by filtration and drying.

11. The method according to claim 10 wherein the particulate substance is kaolin, the solvent is benzene, and the alkylene divinyl ether is 1,4-di(vinyloxy) butane.

12. A product according to claim 1 wherein the clay is kaolin clay and the polymerizate is poly(1,5-bis(vinyloxy)-3-oxapentane).

13. A product according to claim 1 wherein the silica particulate has on the surface thereof a polymerizate of poly(1,5-bis(vinyloxy)-3-oxapentane).

14. A product according to claim 1 and wherein the particulate is silica and the polymerizate is a polymerizate of an alkylene divinyl ether or polyoxy alkylene divinyl ether.

15. A product according to claim 14 and wherein the particulate is silica and the polymerizate is poly(1,4-di-(vinyloxy)butane.

References Cited

UNITED STATES PATENTS

| | | | |
|---|---|---|---|
| 3,272,772 | 9/1966 | Russell | 106—308O |
| 3,409,585 | 11/1968 | Hagemeyer et al. | 106—308R |
| 3,471,439 | 10/1969 | Bixler et al. | 106—308O |

JAMES E. POER, Primary Examiner

U.S. Cl. X.R.

106—308